(12) United States Patent  (10) Patent No.: US 8,405,873 B2
Harada  (45) Date of Patent: Mar. 26, 2013

(54) IMAGE PROCESSING APPARATUS AND IMAGE FORMING APPARATUS USING SAME

(75) Inventor: Hiroyuki Harada, Osaka (JP)

(73) Assignee: Kyocera Mita Corporation (JP)

( * ) Notice: Subject to any disclaimer, the term of this patent is extended or adjusted under 35 U.S.C. 154(b) by 317 days.

(21) Appl. No.: 12/891,901

(22) Filed: Sep. 28, 2010

(65) Prior Publication Data

US 2011/0075170 A1  Mar. 31, 2011

(30) Foreign Application Priority Data

Sep. 30, 2009  (JP) ................................ 2009-228152

(51) Int. Cl.
*G06F 15/00*  (2006.01)
(52) U.S. Cl. .......................... 358/1.9; 358/448; 382/239
(58) Field of Classification Search .................. None
See application file for complete search history.

(56) References Cited

U.S. PATENT DOCUMENTS

2003/0228063 A1*  12/2003  Nakayama et al. ............ 382/251
2007/0098284 A1*  5/2007  Sasaki et al. .................. 382/239
2007/0127043 A1*  6/2007  Maekawa ....................... 358/1.9
2007/0146834 A1*  6/2007  Lee ................................ 358/539
2009/0161170 A1*  6/2009  Harada .......................... 358/448
2009/0226102 A1*  9/2009  Huang et al. .................. 382/233

FOREIGN PATENT DOCUMENTS

JP  9-69919  3/1997

* cited by examiner

*Primary Examiner* — Twyler Haskins
*Assistant Examiner* — Helen Q Zong
(74) *Attorney, Agent, or Firm* — Gerald E. Hespos; Michael J. Porco; Matthew T. Hespos (57) ABSTRACT

When an image forming apparatus sequentially reads the document images of a plurality of pages, forms images on sheets and outputs the sheets (aggregation mode and similar), the image forming apparatus compares, for partial data of the data for a plurality of pages generated by a reading device, coded partial data after first image processing with coded partial data after second image processing. If the coded partial data after first image processing is smaller, the coded data for the plurality of pages after first image processing is caused to be stored in a compressed data storage portion. Then, a first coding/decoding portion is caused to read the stored data, a second image processing portion and similar are caused to perform processing of the data, and a printer is caused to form images on sheets and output the sheets.

8 Claims, 5 Drawing Sheets

IMAGE PROCESSING APPARATUS AND IMAGE FORMING APPARATUS USING SAME

BACKGROUND OF THE INVENTION

1. Field of the Invention

This invention relates to an image forming apparatus realized, for example, as an MFP (Multi-Function Product/Printer/Peripheral), and to an image processing apparatus used therein.

2. Description of the Related Art

An MFP is an image forming apparatus provided with a plurality of functions such as functions of a printer, scanner, fax machine, in addition to a photocopier function. Such apparatuses appeared because, by sharing an image formation portion and a scanner portion, advantages such as reduced costs and smaller installed space became possible. Hence as the memory installed in such apparatuses, low-cost memory having small capacity to the extent possible is desired. However, performance declines if the memory capacity allocated to each function is small.

In particular, during use as a photocopier, large memory capacity is required in an aggregation mode, a sorting mode not using a sorter, a booklet mode, and a mode in which a plurality of copies of a plurality of pages are created. This is because in these modes, jobs are executed in a state in which data for a plurality of pages, which is image data for document images of a plurality of pages, is stored in memory.

An aggregation mode is a mode in which the document images of a plurality of pages are aggregated on a single recording sheet and output.

A sorting mode is a mode in which, when a plurality of copies of document images of a plurality of pages are created, output is performed in a state in which the pages are arranged in each copy. Of such modes, a sorting mode not using a sorter is a mode in which, rather than using a sorter to sort the sheets on which are formed images of pages for each copy, each copy is output, with pages arranged, from the image forming apparatus. For example, when making three copies of a first through a third page, output of a sheet on which is formed the image of the first page, a sheet on which is formed the image of the second page, and a sheet on which is formed the image of the third page, is repeated three times.

A booklet mode is a mode in which a plurality of sheets on which are formed images are formed into a booklet and output.

A mode in which a plurality of copies of a plurality of pages are created is a mode in which the document images of a plurality of pages are read, and a plurality of copies of sheets on which are formed the image for each page are created (preset plurality mode). For example, when making three copies of a first through a third page, output of a sheet on which is formed on the image of the first page is repeated three times, then output of a sheet on which is formed the image of the second page is repeated three times, and then output of a sheet on which is formed the image of the third page is repeated three times.

In an aggregation mode and other modes the memory capacity increases, and so the following image forming apparatus has been proposed. This image forming apparatus has a page memory which comprises a work memory area for electronic sorting which stores bit images, and a file memory area which stores compressed images. This image forming apparatus dynamically sets the file memory area and work memory area according to whether the binarization processing mode of input images is a character mode or a photo mode. By this means, page memory is utilized effectively, and the number of stored pages for electronic sorting can be increased using small memory capacity.

In recent years, even MFPs which are monochrome apparatuses are equipped with full-color scanners, and are capable of saving multivalued data. That is, two CODECs, which are a coding/decoding device (CODEC) which is designed to save multivalued data, and a coding/decoding device (CODEC) which is designed to save binary or four-valued data, are equipped by default. However, even when a monochrome apparatus has a full-color scanner, copy functions store only a preset number of images in memory, or store in memory only the necessary images for jam recovery by an automated document conveyor device. Consequently a monochrome apparatus is not equipped with large-scale memory as in color apparatuses. Hence an increase in the number of stored images using small memory capacity is sought.

However, the above image forming apparatus merely modifies the boundary of memory areas according to the processing format for input data, and does not reduce the quantity of data itself. Hence the efficiency of memory use is improved, but there are limits to increases in the number of stored images.

SUMMARY OF THE INVENTION

An object of this invention is to provide an image processing apparatus which, when performing coding with data compression and storage of the image data of document images for a plurality of pages, can reduce the data quantity, as well as an image forming apparatus using such an image processing apparatus.

The image processing apparatus of one aspect of the invention which attains this object comprises: a reading device which reads a document image and generates image data; a first image processing portion which performs first image processing of the image data generated by the reading device; a compressed data storage portion; a first coding/decoding portion which performs coding with data compression to the image data after the first image processing, and causes the compressed data storage portion to store the coded data, and then performs decoding with data expansion to the stored data and reads out the data from the compressed data storage portion; a second image processing portion which performs second image processing to the image data after the first image processing that is read out by the first coding/decoding portion; a second coding/decoding portion which performs coding with data compression, different from that of the first coding/decoding portion, to the image data after the second image processing, and causes the compressed data storage portion to store the coded data, and then performs decoding with data expansion to the stored data and reads out the data from the compressed data storage portion; and a system control portion, wherein, when document images of a plurality of pages are read sequentially and data for a plurality of pages, which is image data of the document images of the plurality of pages, is generated by the reading device, the system control portion: compares, for partial data which is part of the data for the plurality of pages, the coded partial data after the first image processing with the coded partial data after the second image processing; if the coded partial data after the first image processing is larger, after causing the coded data for the plurality of pages after the second image processing to be stored in the compressed data storage portion, causes the second coding/decoding portion to read the stored data, and outputs the data; and if the coded partial data after the first image processing is smaller, after causing the coded data for the plurality of pages after the first image processing to be stored in the compressed data storage portion, causes the first coding/decoding portion to read the stored data, causes the second image processing portion to perform processing, and outputs the data.

The image forming apparatus of another aspect of the invention which attains the above object is an image forming apparatus, which can execute at least one mode among an aggregation mode, a sorting mode not using a sorter, a booklet mode, and a mode in which a plurality of copies of a plurality of pages are created, comprising: an image processing apparatus of one aspect of this invention; and an image forming portion which forms an image on a sheet based on data output from the image processing apparatus, wherein sequential reading of document images of the plurality of pages by the reading device is executed in at least one of the above modes.

DETAILED DESCRIPTION OF THE PREFERRED EMBODIMENTS

Figure 1:
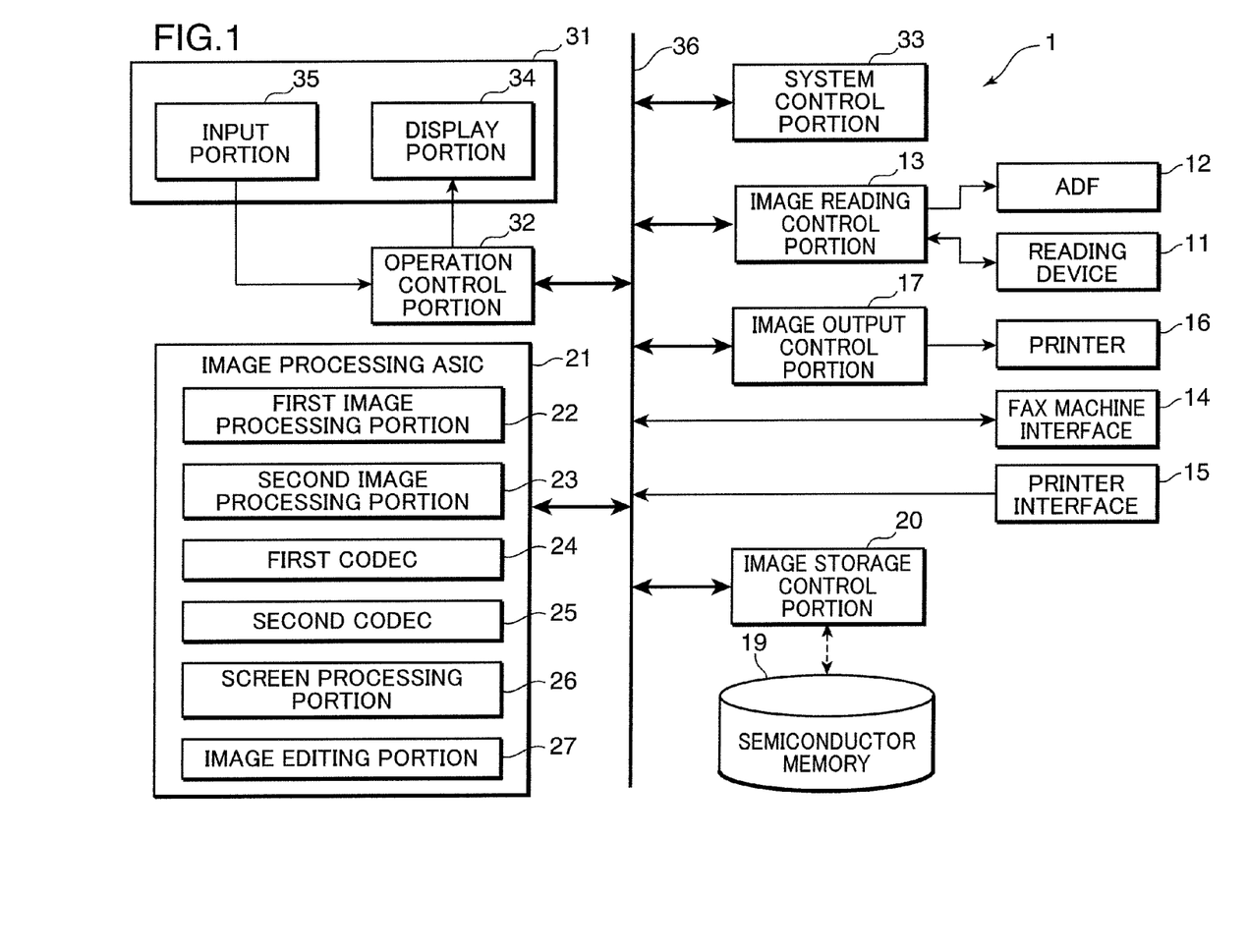
FIG. 1 is a block diagram showing the electrical configuration of the image forming apparatus of one embodiment of the invention.

FIG. 1 is a block diagram showing the electrical configuration of the image forming apparatus 1 of one embodiment of the invention. The image forming apparatus 1 is realized as an MFP which, in addition to functions of a photocopier, is also equipped with a plurality of the functions of a printer, scanner, fax machine, and similar. To this end, the image forming apparatus 1 comprises a reading device 11, automated document conveyor device 12, and image reading control portion 13 to control these; a fax machine interface 14, printer interface 15, printer 16, and image output control portion 17 to control these; a semiconductor memory device 19 and an image storage control portion 20 to control this; an image processing ASIC (Application Specific Integrated Circuit) 21; an input operation portion 31 and an operation control portion 32 to control the input operation portion 31; and a system control portion 33.

The reading device 11 comprises a CCD (Charge Coupled Device), and reads the image of a document placed on a document placement bed or conveyed by the automated document conveyor device 12. In response to operations input to the input operation portion 31 or the state of advance of other processing, the system control portion 33 controls the conveyor timing and speed of the automated document conveyor device 12, and the reading mode in the reading device 11, via the image reading control portion 13. The reading modes include a readout printing mode (a so-called preset 1 mode), in which the automated document conveyor device 12 or document placement bed is used to read and print one page at a time, and a sequential reading mode, in which the automated document conveyor device 12 is used to store image data for image processing, described below. Preset 1 mode includes a mode for creating one copy of one page, and a mode for creating one copy of a plurality of pages. Sequential reading mode includes an aggregation mode, a sorting mode not using a sorter, a booklet mode, and a mode in which a plurality of copies of a plurality of pages are created.

The fax machine interface 14 comprises a fax machine modem, and transmits and receives fax data. The printer interface 15 comprises a printer board which realizes printer linkage, and receives printer data from a host-side terminal.

The printer 16 includes an electrophotography-type image forming apparatus. Data of document images read by the reading device 11, data of received fax images received by the fax machine interface 14, data of printer images received by the printer interface 15, and similar are sent to the printer 16 under control of the image output control portion 17, and the printer 16 prints and outputs these images.

Writing and reading of image data to and from the semiconductor memory device 19 is controlled by the image storage control portion 20. By using the semiconductor memory device 19, the image forming apparatus 1 can store image data when printing and outputting a plurality of pages, can realize sequential reading, and can improve convenience to the user.

The image processing ASIC 21 comprises a first image processing portion 22, second image processing portion 23, first coding/decoding portion (hereafter called a "CODEC") 24, second CODEC 25, screen processing portion 26, and image editing portion 27. The first image processing portion 22 decomposes multivalued image data generated by the reading device 11 comprising a CCD into RGB color components, and further performs γ correction and similar. The second image processing portion 23 performs zoom, sharpness, and density adjustment and similar of the image data after processing by the first image processing portion 22. The screen processing portion 26 performs either approximately binary or quaternary error diffusion and other screen processing of the data after processing by the second image processing portion 23. The image editing portion 27 performs image editing as necessary of the data after screen processing. Image editing may be, for example, 2-in-1 or other aggregation of a plurality of documents onto a single recording sheet, or combining of pages to enable formation into a booklet.

On the other hand, image data after processing by the first image processing portion 22 is temporarily stored by the semiconductor memory device 19, is read as appropriate, and is processed by the second image processing portion 23, screen processing portion 26, and image editing portion 27. After processing by the second image processing portion 23, screen processing portion 26, and image editing portion 27, the image data is temporarily stored by the semiconductor memory device 19, and is read as appropriate by the system control portion 33 with the timing of recording by the printer 16.

And, when storing image data from the first image processing portion 22 in the semiconductor memory device 19, coding with data compression is performed, and upon reading, decoding with data expansion is performed, by the first CODEC 24. Similarly, when causing image data from the screen processing portion 26 and image editing portion 27 to be stored by the semiconductor memory device 19, coding with data compression in a format different from the first CODEC 24 is performed, and upon reading, decoding with data expansion is performed, by the second CODEC 25.

It is preferable that coding processing in the first CODEC 24 be processing designed to compress multivalued data. Coding processing in the second CODEC 25 is processing designed to compress binary or quaternary data. For example, the coding format for image data in the first CODEC 24 is JPEG (Joint Photographic Experts Group), and the coding format for image data in the second CODEC 25 is JBIG (Joint Bi-level Image Experts Group).

The two CODECs 24, 25 of the image processing ASIC 21 and the semiconductor memory device 19 are DMA (direct memory access) connected via the image storage control portion 20. Hence writing and reading of coded data in the semiconductor memory device 19 by the first CODEC 24, and coded data writing and reading in the semiconductor memory device 19 by the second CODEC 25, can be operations performed in parallel. Further, the boundary between the storage areas for the two CODECs 24 and 25 in the semiconductor memory device 19 can be modified appropriately to perform storage.

The input operation portion 31 comprises a liquid crystal display device or other display portion 34, and an input portion 35 including a touch-panel switch of the display portion 34, a key switch, or similar. The input operation portion 31 is used by a user to select the number of copies, magnification, sheets, and similar, and to set the various modes. The operation control portion 32 displays this on the display portion 34 and receives inputs from the input portion 35.

And, the system control portion 33, image reading control portion 13, fax machine interface 14, printer interface 15, image output control portion 17, image storage control portion 20, image processing ASIC 21, and operation control portion 32 are connected by a common bus line 36, and can exchange image data and control data.

In an image forming apparatus 1 configured as described above, it should be noted that in this embodiment the system control portion 33 functions as the following control portions. The system control portion 33 responds to operations input to the input operation portion 31 and controls the reading device 11 and the automated document conveyor device 12 via the image reading control portion 13. And, when the reading device 11 is caused to sequentially read document images of a plurality of pages conveyed from the automated document conveyor device 12, and the image data is caused to be stored by the semiconductor memory device 19, the system control portion 33 compares image data after coding by the first CODEC 24 with image data after coding by the second CODEC 25. This is because depending on the image, saving as multivalued data results in smaller storage memory size, and in general a CODEC which is designed for binary or quaternary saving is not always optimal.

When image data after coding by the first CODEC 24 has a smaller data quantity per unit image area, the system control portion 33 causes processing by the second image processing portion 23, screen processing portion 26, and image editing portion 27 to halt. And, the system control portion 33 assigns a prescribed identification code to image data after processing by the first image processing portion 22, causes coding with data compression to be performed by the first CODEC 24, and causes the semiconductor memory device 19 to store the data.

On the other hand, when image data with an identification code assigned is read from the semiconductor memory device 19, the system control portion 33 causes decoding by the first CODEC 24 and causes processing by the second image processing portion 23, screen processing portion 26 and image editing portion 27, after which the second CODEC 25 is caused to perform coding (monochrome single-bit conversion and similar, described below) as necessary and output. The identification code is simple data such as a low-bit flag, and may be assigned to a prescribed unit of each packet or similar.

Specifically, when the user operates the input operation portion 31 and selects a mode in which saving of a plurality of pages is unnecessary (for example, the above preset 1 mode), the system control portion 33 executes the following control. After the image data has been subjected to the first and second image processing by the first and second image processing portions 22 and 23 in the usual manner, the system control portion 33 causes the second CODEC 25 to perform coding, and stores the result in the semiconductor memory device 19.

That is, for the image data from the reading device 11, the system control portion 33 does not compare the image data after coding by the first CODEC 24 with the image data after coding by the second CODEC 25, and moreover does not halt processing by the second image processing portion 23, screen processing portion 26 or image editing portion 27. And, the system control portion 33 causes processing by the first image processing portion 22, first CODEC 24, second image processing portion 23, and second CODEC 25, and causes the semiconductor memory device 19 to store the image data after coding by the second CODEC 25.

However, in a mode which requires saving of a plurality of pages, such as for example an aggregation mode, a sorting mode not using a sorter, a booklet mode, and a mode in which a plurality of copies of a plurality of pages are created, the system control portion 33 selects the following two types of processing according to conditions. First, when the data quantity of image data after coding by the second CODEC 25 is smaller, the system control portion 33 similarly causes the second CODEC 25 to perform coding of image data after processing by the first and second image processing portions 22 and 23, screen processing portion 26, and image editing portion 27, as usual, and stores the result in the semiconductor memory device 19. Second, on the other hand, when the data quantity of image data is smaller when coding by the first CODEC 24 has ended, the system control portion 33 first stores the image data at that time in the semiconductor memory device 19, and moreover halts processing by the second image processing portion 23, screen processing portion 26, and image editing portion 27. The system control portion 33 causes this image data, when read from the semiconductor memory device 19, to be decoded by the first CODEC 24, after which processing is performed by the remaining second image processing portion 23, screen processing portion 26 and image editing portion 27, and the result is output.

For example, when a document is a photo, after coding by the first CODEC 24, the data is multivalued bitmap data. By performing second image processing on this data, the image data becomes binary or quaternary. In such a case, storing the data after coding by the second CODEC 25 results in a smaller data quantity per unit pixel. On the other hand, when the document is a monochrome written document, after coding by the first CODEC 24 the result is binary bitmap data, and by performing second image processing of this data, the image data becomes binary or quaternary screen-processed data. In such a case, data after coding by the first CODEC 24 is stored, and the data quantity per unit pixel is small.

Normally, the data quantity can be made smaller for processing by the second CODEC 25 than for processing by the first CODEC 24. In this embodiment, as explained above, the data quantities are compared for processing by the first CODEC 24 and for processing by the second CODEC 25, and the CODEC enabling the smaller data quantity (the truly optimal-method CODEC) is used to save data. Hence even in inexpensive equipment using a semiconductor memory device 19 without using a hard disk device, the number of storage pages of image data can be increased. Further, by equipping an image forming apparatus 1 realized as an MFP with such a configuration, the storage capacity of a reading device 11 (scanner portion) consuming the largest storage area can be reduced. An MFP is an image forming apparatus 1 which must allocate storage areas to numerous functions, and the reading device 11 consumes the largest storage area. When, as a result of performing processing of the same image data using the two CODECs, the data quantity is smaller for the first CODEC 24, the system control portion 33 may interrupt the second CODEC 25 and stop processing. By this means, the processing of the second image processing portion 23, screen processing portion 26, and image editing portion 27 is halted.

Figure 2A:
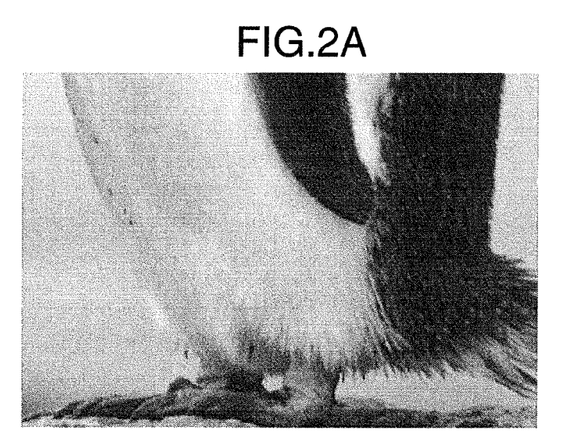
FIGS. 2A, 2B and 2C show the results of experiments conducted by the inventor.
Figure 2B:
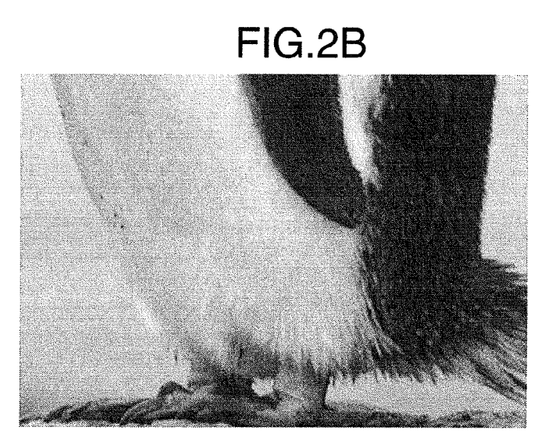
Figure 2C:
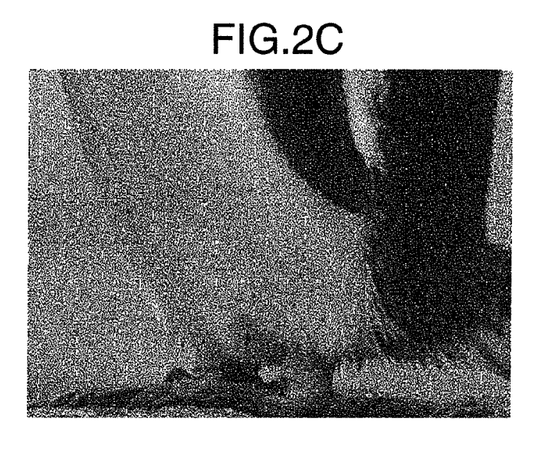

FIGS. 2A, 2B and 2C show the result of experiments performed by the inventor. As indicated in Table 1, in experiments photographic images were read as documents, and were coded as 4-bit JPEG with quality 90, 60, and 30 by the first CODEC 24, and were coded as binary JBIG by the second CODEC 25. Table 1 indicates compressed data quantities using the CODECs 24 and 25 when an A4-size document was read at high speed at 300 dpi; units are bytes.

TABLE 1

| CODEC | JBIG | JPEG | | |
|---|---|---|---|---|
|  |  | Q30 | Q60 | Q90 |
| Size | 928,571 | 436,328 | 666,788 | 2,900,081 |

FIG. 2A is shown JPEG quality 90, FIG. 2B is shown JPEG quality 30, FIG. 2C is shown JBIG, and JPEG quality 60 is omitted. In the screen processing portion 26, halftone processing using error diffusion is performed.

As is clear from FIGS. 2A-2C and Table 1, in the case of JPEG, even at quality 30 the gradation properties are smooth compared with JBIG, and moreover granularity is also satisfactory. In the case of JBIG, after high-speed reading at 300 dpi and saving as JPEG, zoom processing, filter processing, and gradation processing are performed at high resolution of 600 dpi, 1-bit screen processing is performed, and the data is saved. On the other hand, in the case of JPEG, 4-bit screen processing is performed, and data is saved with 8 bits. Hence when the JPEG quality is 90, there is a dramatic increase in data quantity, but at qualities of 60 and 30, the data quantity is smaller than for JBIG.

Hence from the standpoint of image quality and data quantity, the first CODEC 24 uses, as the JPEG quality, a quality of for example 30 or 60.

Figure 3:
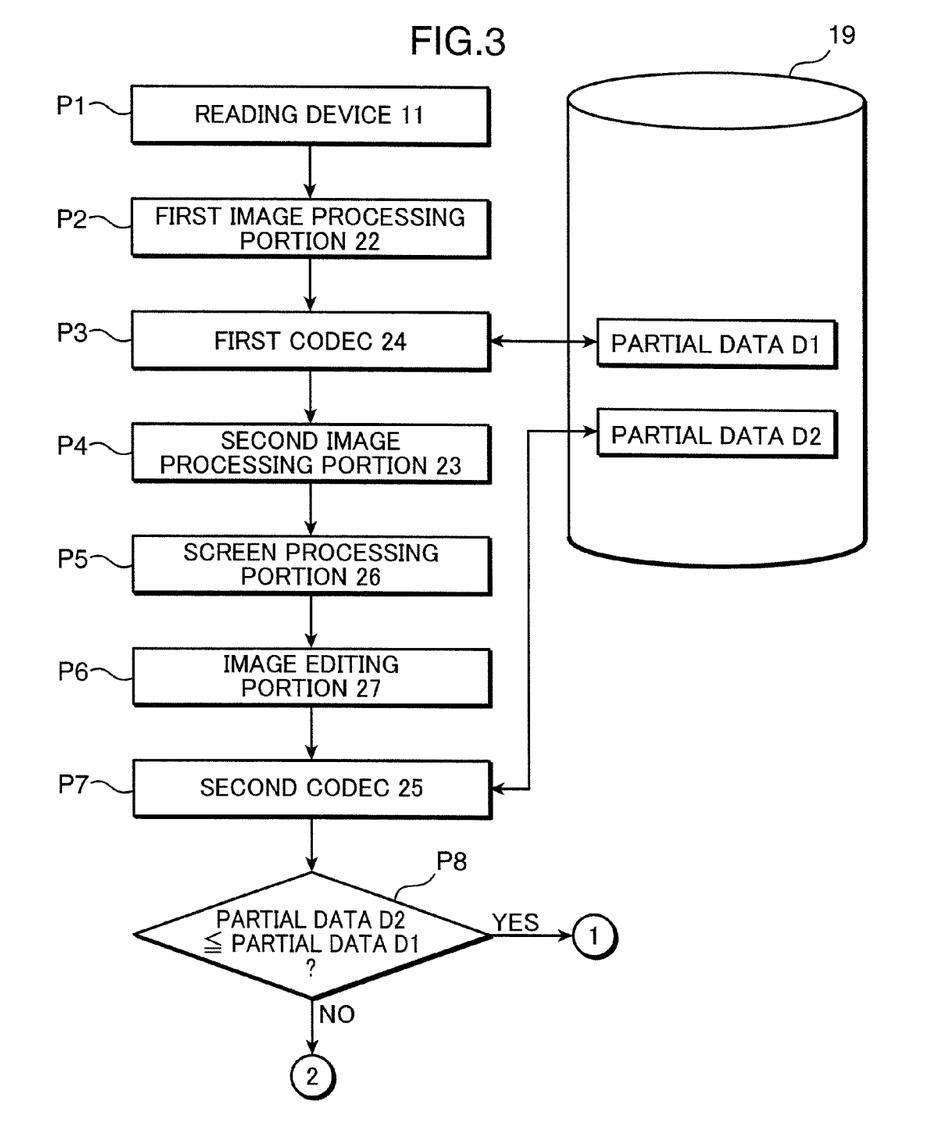
FIG. 3 is a (first) explanatory diagram of processing, in an image forming apparatus of an embodiment, to read a document image, perform first and second image processing of the image data, form an image on a sheet and perform output.
Figure 4:
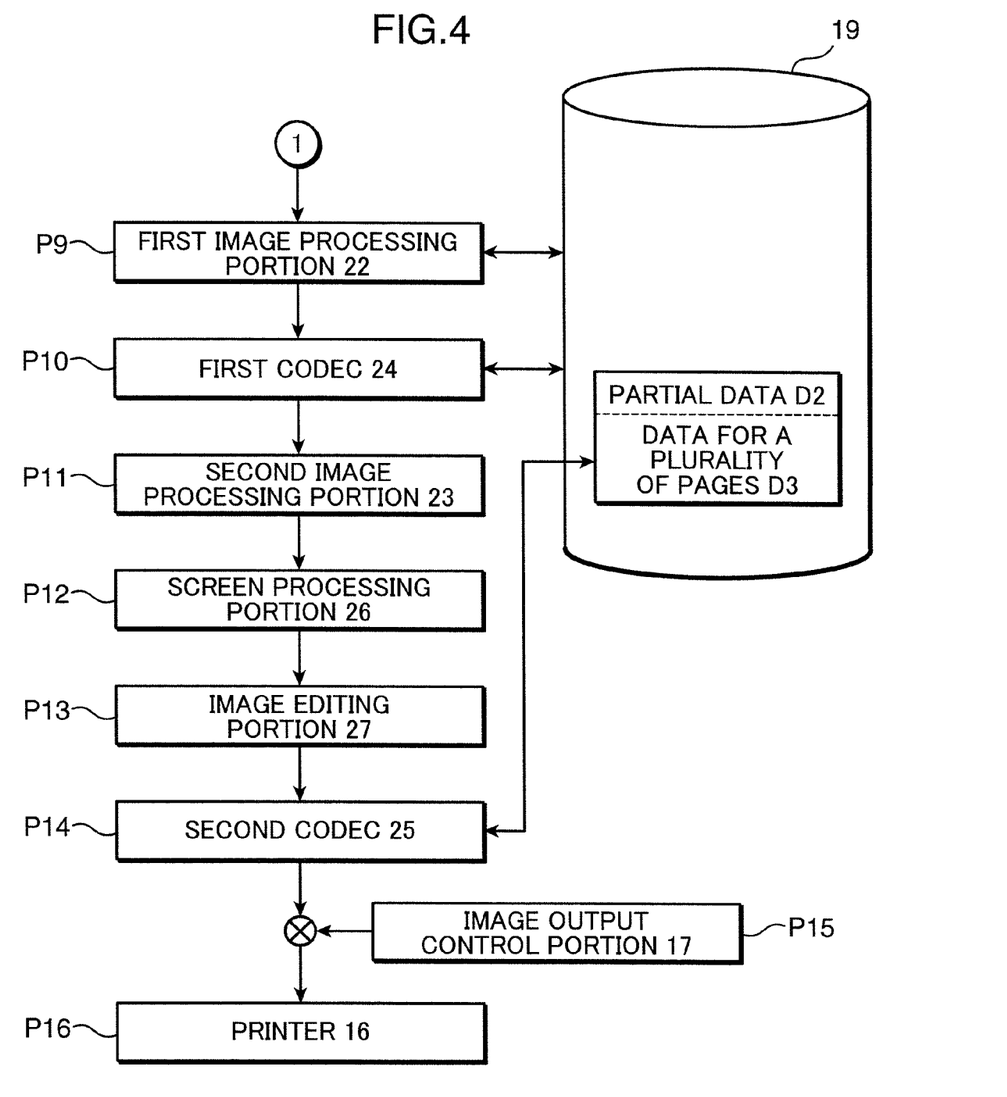
FIG. 4 is a (second) explanatory diagram of the above processing.
Figure 5:
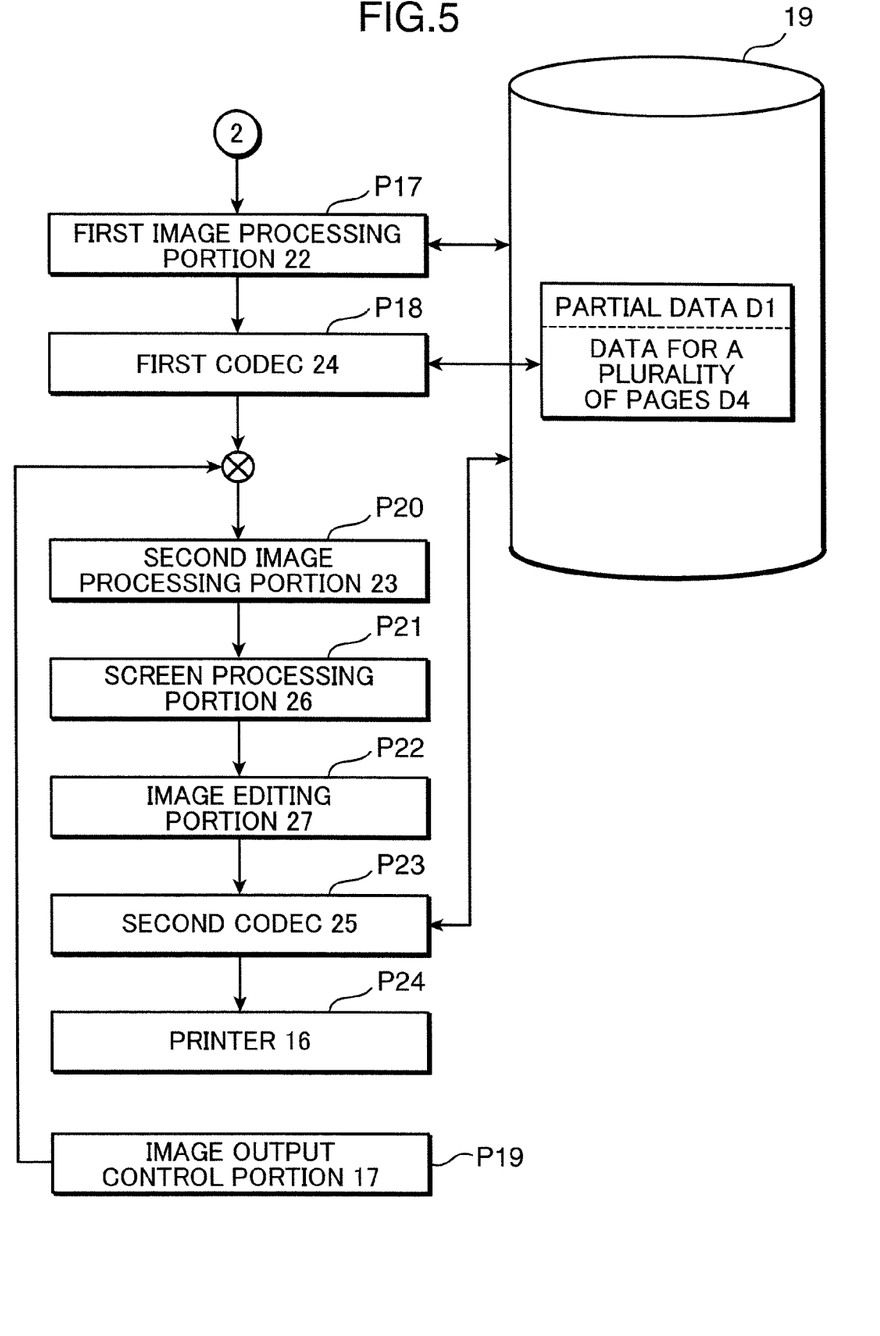
FIG. 5 is a (third) explanatory diagram of the above processing.

Next, in the image forming apparatus 1 shown in FIG. 1, processing is explained in detail in which document images are read, the first and second image processing and similar are performed on the image data, and images are formed on sheets and output. FIG. 3, FIG. 4 and FIG. 5 are diagrams explaining this processing. In the diagrams, arrows indicate the flow of data. The semiconductor memory device 19 functions as a compressed data storage portion. An image forming mode is either an aggregation mode, a sorting mode not using a sorter, a booklet mode, or a mode in which a plurality of copies of a plurality of pages are created.

As shown in FIG. 3, document images for a plurality of pages are read sequentially (processing P1) by the reading device 11. The data for a plurality of pages, which is image data of document images for a plurality of pages read and generated, is stored temporarily in a buffer in prescribed units (for example image data for several lines), and is successively sent to the first image processing portion 22.

The system control portion 33 causes processing P2 through P7 to be executed, for partial data among the data for a plurality of pages, by the first image processing portion 22, first CODEC 24, second image processing portion 23, screen processing portion 26, image editing portion 27, and second CODEC 25. Partial data is for example image data for the first page of the plurality of pages, or image data for a prescribed area of the first page. Processing P2 through P7 is explained separately.

The first image processing portion 22 performs the first image processing of partial data output from the reading device 11 (processing P2). The first CODEC 24 performs coding with JPEG data compression to the partial data after the first image processing D1, and after storing in the semiconductor memory device 19, performs decoding with data expansion to the stored data, and reads from the semiconductor memory device 19 (processing P3).

The second image processing portion 23 performs the second image processing (processing P4) of the partial data after first image processing D1 which was read by the first CODEC 24 (processing P4). The screen processing portion 26 performs screen processing of the partial data processed by the second image processing portion 23 (processing P5). The image editing portion 27 performs image editing processing of the partial data processed by the screen processing portion 26 (processing P6).

In this embodiment, the partial data after second image processing D2 means the partial data after the second image processing has been performed. That is, when image editing processing is also performed, the partial data which has been processed by the image editing portion 27 is the partial data after second image processing D2. When screen processing is to be performed, but image editing processing is not to be performed, the partial data which has been processed by the screen processing portion 26 is the partial data after second image processing D2. When neither image editing processing nor screen processing are to be performed, the partial data which has been processed by the second image processing portion 23 is the partial data after second image processing D2.

The second CODEC 25 performs coding with JBIG data compression to the partial data after second image processing D2 (here, partial data after image editing), and causes the semiconductor memory device 19 to store the data (processing P7).

The system control portion 33 compares the JPEG-coded partial data after first image processing D1 with the JBIG-coded partial data after second image processing D2, stored by the semiconductor memory device 19 (processing P8).

If the system control portion 33 judges that the JPEG-coded partial data after first image processing D1 has a data quantity greater than the JBIG-coded partial data after second image processing D2 ("Yes" in processing P8), the processing P9 through P16 shown in FIG. 4 is executed.

Specifically, in the processing P1 the data for a plurality of pages generated by the reading device 11 is sent successively in prescribed units to the first image processing portion 22. Hence of the data for the plurality of pages, the remaining data other than the partial data is subjected to processing P9 by the first image processing portion 22, processing P10 by the first CODEC 24, processing P11 by the second image processing portion 23, processing P12 by the screen processing portion 26, and processing P13 by the image editing portion 27. And, the second CODEC 25 performs coding with JBIG data compression to the remaining data after the second image processing (here, remaining data after image editing), and causes the semiconductor memory device 19 to store the data (processing P14). As a result, JBIG-coded data for the plurality of pages after the second image processing D3 is stored by the semiconductor memory device 19.

The system control portion 33 issues an image output command to the image output control portion 17 (processing P15). Based on this command, the image output control portion 17 causes the second CODEC 25 to execute reading. By this means, the JBIG-coded data for a plurality of pages after second image processing D3 is subjected to decoding with data expansion, for example in amounts of the image data for one page, and is read from the semiconductor memory device 19.

The printer 16 forms images on sheets in amounts of the image data for one page read from the semiconductor memory device 19, and outputs the sheets (processing P16).

On the other hand, in the processing P8 of FIG. 3, if the system control portion 33 judges that the data quantity of the JPEG-coded partial data after first image processing D1 is smaller than that of the JBIG-coded partial data after second image processing D2 ("No" in processing P8), the processing P17 through P24 of FIG. 5 is executed.

Specifically, in the processing P1 the data for a plurality of pages generated by the reading device 11 is sent successively in prescribed units to the first image processing portion 22. Hence of the data for the plurality of pages, the remaining data other than the partial data is subjected to processing by the first image processing portion 22 (processing P17). And, the first CODEC 24 performs coding with JPEG data compression of the remaining data after the first image processing and causes the semiconductor memory device 19 to store the data (processing P18). As a result, JPEG-coded data for the plurality of pages after the first image processing D4 is stored by the semiconductor memory device 19.

In this storage, the system control portion 33 performs processing to assign a prescribed identification code (for example a flag) to the coded data for the plurality of pages after first image processing D4. This is in order to enable identification of the data with the prescribed identification code assigned, among the data stored in the semiconductor memory device 19, for second image processing and similar processing, and for output.

During the processing P18, the system control portion 33 causes the processing of the second image processing portion 23, screen processing portion 26, image editing portion 27, and second CODEC 25 to be halted.

When the system control portion 33 issues an image output command to the image output control portion 17 (processing P19), the image output control portion 17 causes the first CODEC 24 to execute reading. The first CODEC 24 searches the coded data D4 for the plurality of pages after first image processing, based on the prescribed identification code, from among the data stored in the semiconductor memory device 19. The first CODEC 24 performs decoding with data expansion of the JPEG-coded data D4 for the plurality of pages after first image processing, for example in amounts of the image data for one page, and reads from the semiconductor memory device 19. The image data for one page which has been read is subjected to processing P20 by the second image processing portion 23, processing P21 by the screen processing portion 26, processing P22 by the image editing portion 27, and processing P23 by the second CODEC 25. Hence coded data D3 for the plurality of pages after the second image processing is not accumulated in the semiconductor memory device 19.

In amounts of the image data for one page read from the semiconductor memory device 19 by the second CODEC 25, the printer 16 forms images on sheet and outputs the sheets (processing P24).

As explained above, when in this embodiment document images for a plurality of pages are read sequentially and images are formed on sheets which are output (aggregation mode and similar), for partial data, the JPEG-coded partial data after first image processing D1 and the JBIG-coded partial data after second image processing D2 are compared.

And, if the data quantity of the partial data D1 is greater, the JBIG-coded data for the plurality of pages after second image processing D3 is caused to be stored by the semiconductor memory device 19. Thereafter, the stored data is caused to be read by the second CODEC 25, and the printer 16 is caused to form images on sheets and output the sheets.

On the other hand, if the data quantity of the partial data D1 is smaller, the JPEG-coded data for the plurality of pages after first image processing D4 is caused to be stored by the semiconductor memory device 19. Thereafter, the first CODEC 24 is caused to read the stored data, the second image processing portion 23 and similar are caused to perform processing, and the printer 16 is caused to form images on sheets and output the sheets.

Hence by means of this embodiment, the coded data for the plurality of pages D3 or D4 with the smaller data quantity is stored by the semiconductor memory device 19. Hence when data for a plurality of pages (image data of document images for a plurality of pages) is coded with data compression and stored, the data quantity can be reduced. By this means, the amount of data for a plurality of pages which can be stored by the semiconductor memory device 19 (the number of stored images) can be increased.

This application is based on Japanese Patent application serial No. 2009-228152 filed in Japan Patent Office on Sep. 30, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing apparatus, comprising:
a reading device which reads a document image and generates image data;
a first image processing portion which performs first image processing of the image data generated by the reading device;
a compressed data storage portion;
a first coding/decoding portion which performs coding with data compression to the image data after the first image processing, and causes the compressed data storage portion to store the coded data as a first coding processing, and then performs decoding with data expansion to the stored data and reads out the data from the compressed data storage portion as a first decoding processing;
a second image processing portion which performs second image processing to the image data after the first image processing that is read out by the first coding/decoding portion;
a second coding/decoding portion which performs coding with data compression, different from that of the first coding/decoding portion, to the image data after the second image processing, and causes the compressed data storage portion to store the coded data as a second coding processing, and then performs decoding with data expansion to the stored data and reads out the data from the compressed data storage portion as a second decoding processing; and a system control portion, wherein, when document images of a plurality of pages are read sequentially and data for a plurality of pages, which is image data of the document images of the plurality of pages, is generated by the reading device, the system control portion:

causes the first image processing portion to perform the first image processing for partial data which is part of the data for the plurality of pages; causes the first coding/decoding portion to perform the first coding processing for the partial data after the first image processing; causes the first coding/decoding portion to perform the first decoding processing for the partial data after the first coding processing; causes the second image processing portion to perform the second image processing for the partial data after the first decoding processing; causes the second coding/decoding portion to perform the second coding processing for the partial data after the second image processing in order to generate the partial data after the first coding processing and the partial data after the second coding processing; and causes the compressed data storage portion to store the partial data after the first coding processing and the partial data after the second coding processing;

compares the partial data after the first coding processing with the partial data after the second coding processing stored in the compressed data storage portion;

if the partial data after the first coding processing is larger, causes the first image processing portion to perform the first image processing for remaining data other than the partial data in the data for the plurality of pages; causes the first coding/decoding portion to perform the first coding processing for the remaining data after the first image processing; causes the first coding/decoding portion to perform the first decoding processing for the remaining data after the first coding processing; causes the second image processing portion to perform the second image processing for the remaining data after the first decoding processing; causes the second coding/decoding portion to perform the second coding processing for the remaining data after the second image processing in order to store the remaining data after the second coding processing in the compressed data storage portion that has stored the partial data after the second coding processing; and causes the second coding/decoding portion to perform the second decoding processing to read and output the data for the plurality of pages from the compressed data storage portion; and if the partial data after the first coding processing is smaller, causes the first image processing portion to perform the first image processing for remaining data other than the partial data in the data for the plurality of pages; causes the first coding/decoding portion to perform the first coding for the remaining data after the first image processing in order to store the remaining data after the first coding processing in the compressed data storage portion, which has stored the partial data after the first coding processing; causes the first coding/decoding portion to perform the first decoding processing to read the data for the plurality of pages from the compressed data storage portion; and causes the second image processing portion to perform the second image processing and output the data for the plurality of pages after the first decoding processing.

2. The image processing apparatus according to claim 1, wherein the first image processing portion decomposes multivalued image data generated by the reading device into RGB color components and also performs γ correction, as the first image processing.

3. The image processing apparatus according to claim 1, wherein the second image processing portion performs zoom, sharpness, and density correction as the second image processing.

4. The image processing apparatus according to claim 1, wherein coding processing by the first coding/decoding portion includes processing to compress multivalued data, and coding processing by the second coding/decoding portion includes processing to compress binary or quaternary data.

5. The image processing apparatus according to claim 4, wherein a format for coding of image data by the first coding/decoding portion is JPEG, and a format for coding of image data by the second coding/decoding portion is JBIG.

6. The image processing apparatus according to claim 1, wherein
if the coded partial data after the first image processing is smaller, the system control portion assigns a prescribed identification code to the data for the plurality of pages after the first image processing, coded by the first coding/decoding portion, and causes the compressed data storage portion to temporarily store the data to be assigned the prescribed identification code, and
when causing the first coding/decoding portion to read the data for the plurality of pages after the first image processing, to which the identification code is assigned, the system control portion causes the second image processing portion to perform processing of the read data and output the processed data.

7. An image forming apparatus, which can execute at least one mode among an aggregation mode, a sorting mode not using a sorter, a booklet mode, and a mode in which a plurality of copies of a plurality of pages are created, comprising:
the image processing apparatus according to claim 1; and
an image forming portion which forms an image on a sheet based on data output from the image processing apparatus,
wherein sequential reading of document images of the plurality of pages by the reading device is executed in at least one of the modes.

8. The image forming apparatus according to claim 7, wherein the image forming apparatus can execute a mode in which one copy of a plurality of pages is created, and in the mode in which one copy is created, the control portion causes the first image processing portion and the second image processing portion to perform processing, without performing the comparison for image data from the reading device.

* * * * *